July 24, 1923.

D. J. McADAM, JR 1,462,813

IMPACT TESTING MACHINE

Filed Nov. 7, 1919

Inventor—
Dunlap J. McAdam Jr.
by his Attorneys—
Howson & Howson

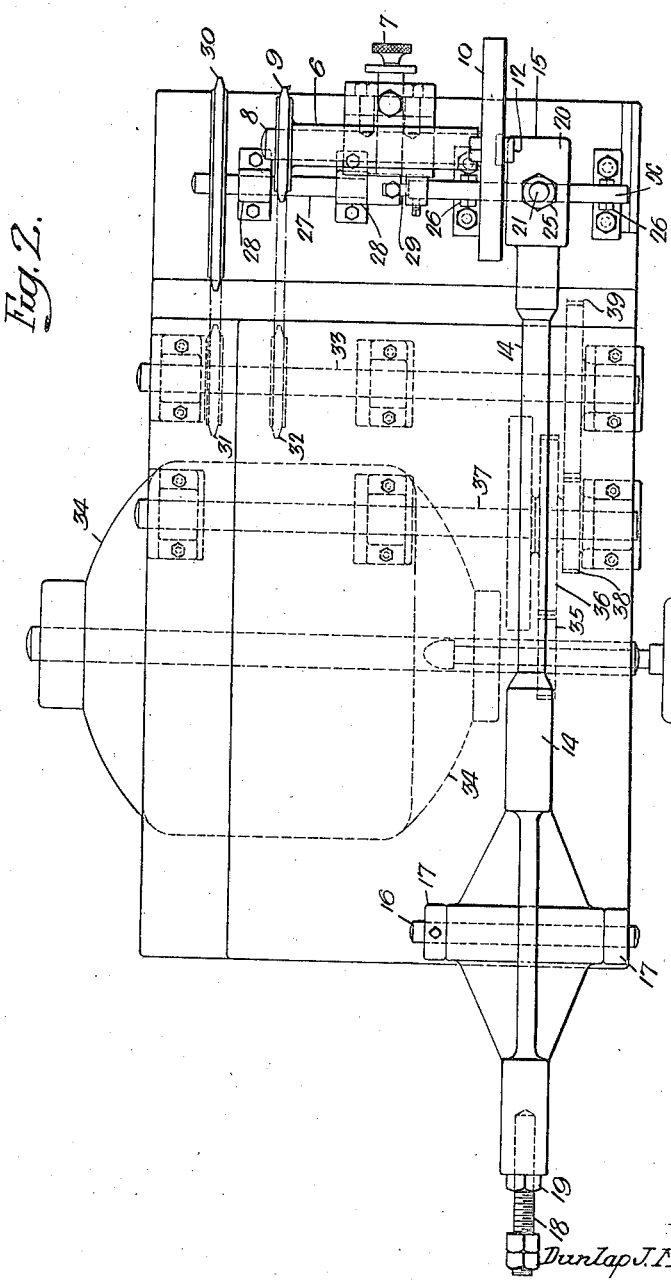

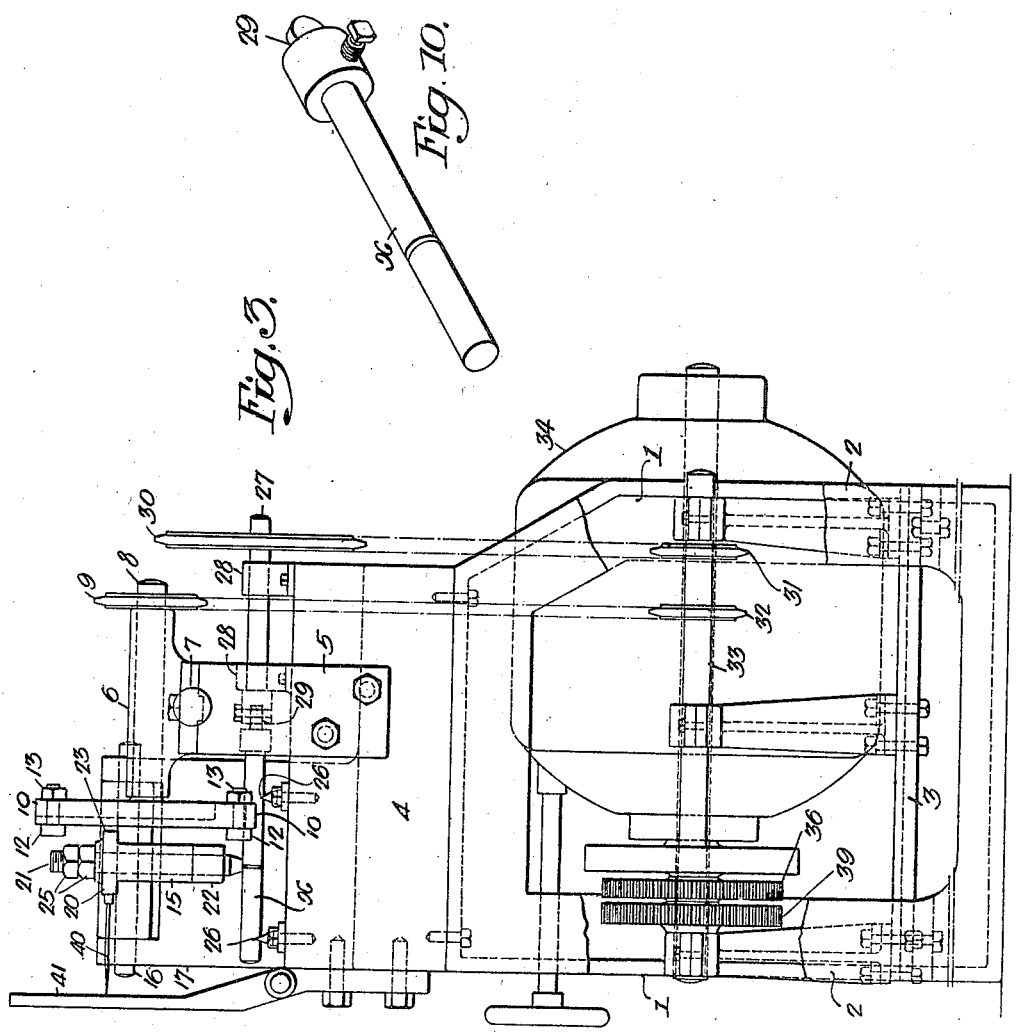

July 24, 1923.
D. J. McADAM, JR
1,462,813
IMPACT TESTING MACHINE
Filed Nov. 7, 1919
4 Sheets—Sheet 4
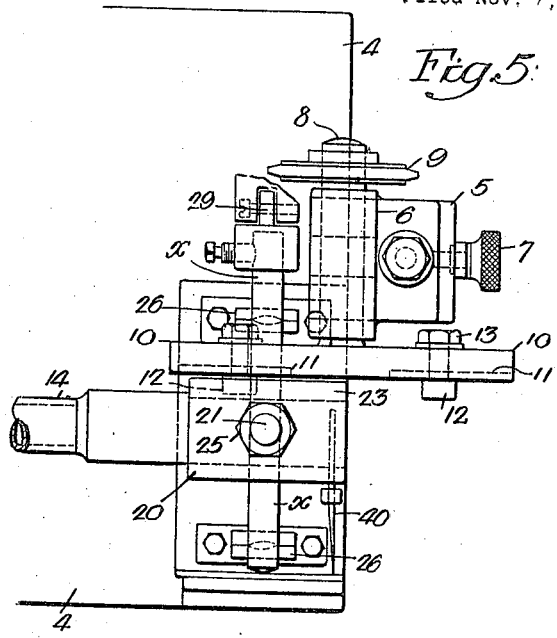
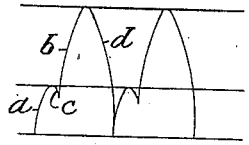
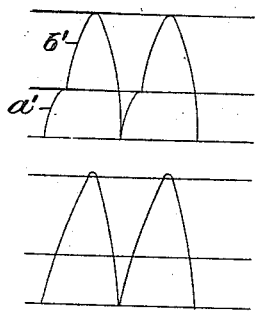
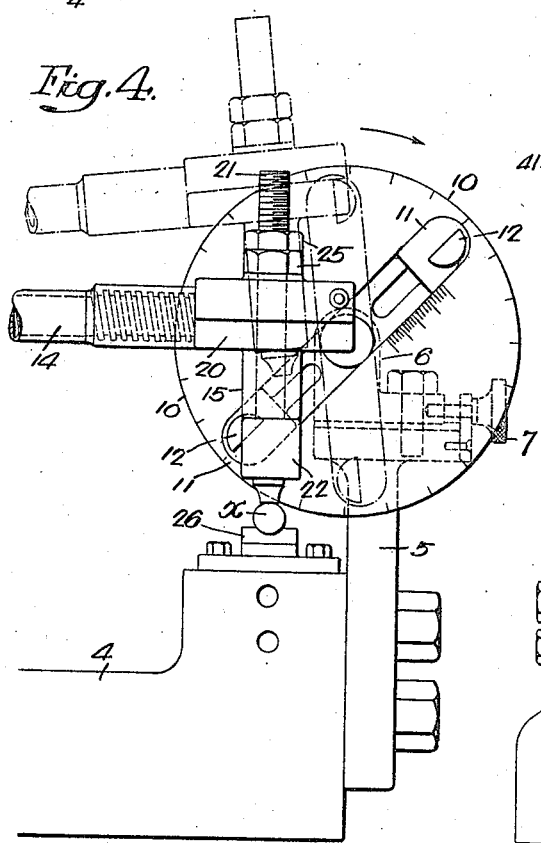
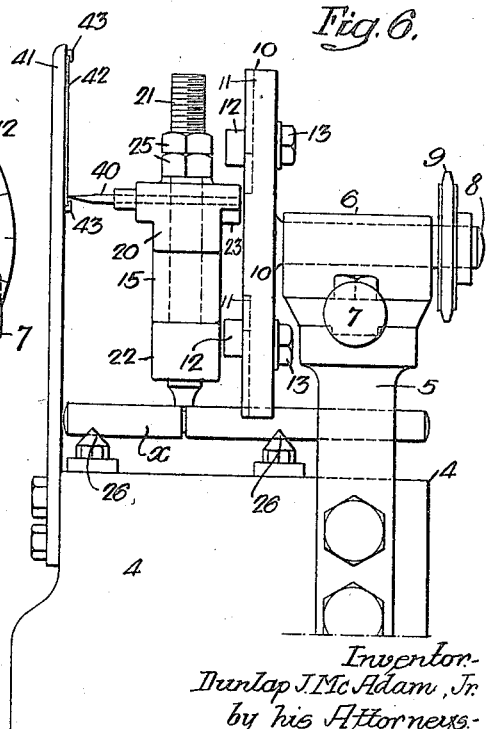
Inventor-
Dunlap J. McAdam, Jr.
by his Attorneys-
Howson & Howson Patented July 24, 1923.

1,462,813

UNITED STATES PATENT OFFICE.

DUNLAP J. McADAM, JR., OF ANNAPOLIS, MARYLAND, ASSIGNOR TO TINIUS OLSEN TESTING MACHINE COMPANY, OF PHILADELPHIA, PENNSYLVANIA, A CORPORATION OF PENNSYLVANIA.

IMPACT-TESTING MACHINE.

Application filed November 7, 1919. Serial No. 336,413.

*To all whom it may concern:*

Be it known that I, DUNLAP J. MCADAM, Jr., a citizen of the United States, residing in Annapolis, Maryland, have invented Impact-Testing Machines, of which the following is a specification.

My invention relates to machines for subjecting a test specimen of definite cross sectional area to a succession of blows delivered by a hammer, with a view to determining its endurance, and one object thereof is to provide a machine which shall operate at relatively high speed and at the same time be of such construction as to give highly accurate results.

A further object of the invention is to provide novel means for actuating the hammer of an impact testing machine whereby the distance dropped through by said hammer under the action of gravity shall be maintained uniform even though the machine be operated at high speeds;—the invention contemplating relatively simple and conveniently adjusted means for varying the energy of the blow struck by the hammer.

It is further desired to provide an impact testing machine which shall be substantial, simple and compact in construction and which shall include relatively simple and convenient means for graphically recording the movement of the hammer under conditions of use;—the invention contemplating also novel means for adjusting the distance through which the hammer is dropped as well as the point at which the hammer is released after being raised for a blow.

These objects and other advantageous ends I attain as hereinafter set forth, reference being had to the accompanying drawings, in which, Figs. 1 and 2 are respectively a side elevation and a plan of an impact testing machine constructed in accordance with my invention;

Fig. 3 is a rear elevation partly in vertical section further illustrating the machine shown in Figs. 1 and 2;

Figs. 4 and 5 are respectively a side elevation and a plan of the hammer head with its raising mechanism and certain of the parts associated therewith, certain of the dimensions and details being slightly different from those of Figs. 1 to 3 inclusive;

Fig. 6 is an end elevation of the parts shown in Fig. 4;

Figs. 7, 8 and 9 are diagrams illustrating graphically the movement of the hammer; and Fig. 10 is a perspective view of the test specimen and its associated chuck.

Figure 1:
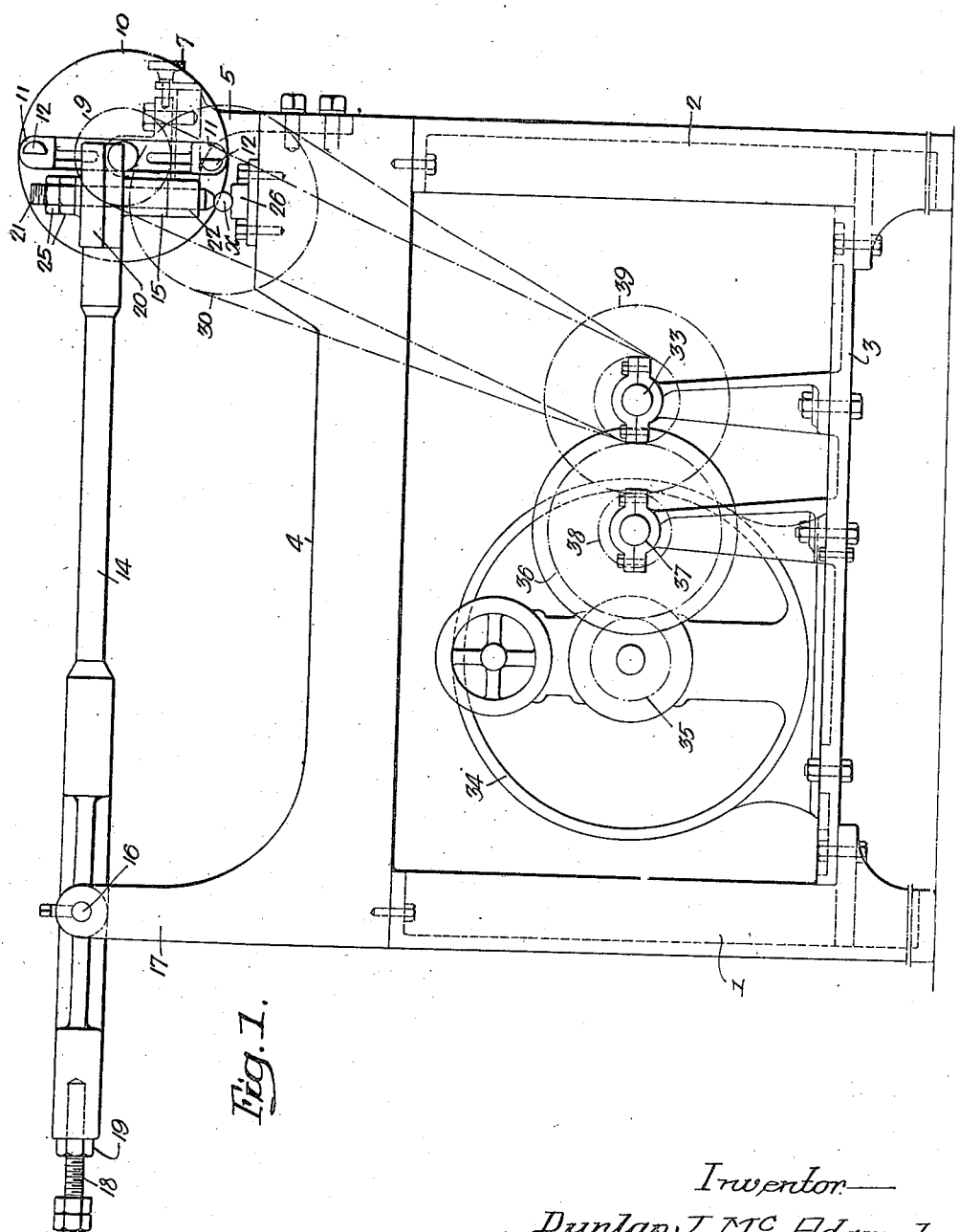

In the above drawings 1 and 2 represent the front and rear ends of a supporting frame having a base portion 3 and a top or table portion 4. On the rear of the top portion 4 of the frame is mounted a standard 5 having a flat top formed with a forwardly extending guideway for the reception of a bearing 6, which by means of an adjusting screw 7, is movable toward or from the front of the machine.

This bearing has rotatably mounted in it a short shaft or spindle 8 having fixed on one end a sprocket wheel 9 and carrying at its opposite end a disc 10. The outer flat face of the latter is provided with a diametrically extending guideway for the reception of two blocks 11 formed with outwardly extending tappets 12 preferably of semi-cylindrical form. These blocks are adjustable radially in the guideway of the disc 10 and are held in any given positions by clamping bolts 13 extending through the disc and operative in radially formed slots.

The hammer of my invention consists of a tubular arm or handle 14 having a head 15 at one end and adjacent its opposite end pivotally supported on a pin 16 fixed in the arms of a bracket or standard 17 projecting upwardly from the top portion 4 of the frame. The handle 14 projects forwardly beyond its pivotal support and has mounted in its extremity a longitudinally adjustable bolt 18 held in any given position by a jam nut 19. The head of the hammer consists of a steel block 20 threaded or otherwise fixed to the tubular arm or handle 14 and having extending vertically through it the threaded stem 21 of a specimen-engaging piece 22 whose lower extremity is reduced in cross section so as to be capable of properly engaging a test specimen *x*.

The block 20 of the head at the side adjacent the outer face of the disc 10 carries a projecting shoulder 23 of hardened steel whose flat under face preferably lies in the axial plane including the center line of the hammer arm 14 and its pivot 16. This shoulder is so positioned as to be engaged by the cylindrically curved surfaces of the tappets 12 as the disc 10 is turned, and the machine is so designed that the axis of revolution of the disc is below the lowest point reached by the under or contact surface of the shoulder 23, by an amount equal to the radius of the curved surface of either tappet. As a result, regardless of the positions of the blocks 11 in their guideway, the tappets will always engage the shoulder 23 and begin to lift the hammer under operating conditions when their flat surfaces are in the horizontal plane including the axis of rotation of the disc.

The specimen-engaging portion 22 of the hammer head is held to the body or main portion 20 thereof by one or more jam nuts 25 threaded upon the upper end of its stem and the weight of the hammer may be varied by the addition of extra prices of the desired mass placed upon the stem 21 between the body 20 and the nuts 25, which rigidly clamp such pieces or pieces in position.

The specimen $x$ to be tested, which usually consists of an elongated bar (Fig. 10), is mounted on suitable supporting bearings 26 carried by the rear portion of the frame top 4 at equal distances on opposite sides of the line of action of the hammer head and for the purpose of rotating it under operating conditions I provide a shaft 27 supported by bearings 28 in line with said specimen and connected thereto by a suitable coupling or chuck 29. This shaft has fixed to its outer end a sprocket wheel 30.

This shaft 27 and the shaft 6 carrying the disc 10 are rotated by sprocket wheels 31 and 32 on the shaft 33 connected to the sprocket wheels 30 and 9 respecively by suitable sprocket chains, and said shaft 33 is continuously rotated by power from a suitable source such as an electric motor 34 mounted upon the lower or base portion 3 of the frame and connected to said shaft through gears 35 and 36, a counter shaft 37 and gears 38 and 39.

Under conditions of operation a test specimen $x$ is mounted upon the bearings 26 and is connected through the chuck 29 to the shaft 27. The motor 34 is then put in operation to turn the disc 10 in a clockwise direction so that the curved surfaces of the tappets 12 alternately engage the shoulder 23 of the hammer head, raising the latter as the disc turns through an angle of substantially 90° and releasing said head as they reach what is approximately their highest point of movement. Said head thereupon falls under the action of gravity so that its hardened portion 22 strikes the test specimen immediately over the notched or nicked portion thereof, midway between the points of support provided by the bearings 26. The speed of the motor is preferably such that after the hammer has been released and allowed to drop by one of the tappets 12, its shoulder 23 is engaged by the other tappet as it rebounds after engaging the test specimen,—the adjustment being such that said hammer is caught by the tappet at or adjacent the top of its rebound from the test specimen and is thereafter carried up to its releasing point.

In order to determine just when this adjustment of parts is attained, I preferably mount a pencil 40 so that it projects horizontally from the hammer head on the side thereof opposite that adjacent the disc 10 and fix an arm 41 on the rear part of the frame 4 so that it will support a record sheet 42 in position to be engaged by the point of said pencil. The arm or standard 41 is provided with supports 43 which permit the record sheet to be moved in a horizontal line parallel to the plane of movement of the hammer so that as the latter is alternately raised and dropped on the test specimen, it will make records similar to one of those shown in Figs. 7 to 9 inclusive.

The first of these diagrams illustrates the conditions existing when the speed of the disc 10 is somewhat too slow, for the part $c$ of the diagram indicates that the hammer has begun to move downwardly after having rebounded through the space indicated by the part $a$;—the part $b$ indicating that portion of the upward path of the hammer through which it was raised by the tappet 12. The part $d$ of the diagram indicates the path traced by the pencil during the drop of the hammer.

From the diagram shown in Fig. 8 it will be seen that the hammer was caught by the tappet at the top of its rebound movement $a^1$ and was thereafter lifted through the path $b^1$ and while this adjustment is better than that of Fig. 7, it is also preferable to that shown in the diagram Fig. 9 which indicates that the speed of the disc 10 has been further increased to such a point that the hammer is caught by the tappet in such manner that its movement from its lowest to its highest position is unbroken, the objection to the latter speed being due to the fact that it causes a slight upward throw of the hammer at the top of its stroke which results in a non-uniform drop.

With my device it will be noted that the hammer is first engaged by the tappets when the vertical component of their upward movement is a maximum, being released at the time when such component is practically zero, and in order to adjust the machine so that the tappets release the hammer at the position found to give the best results, I shift the position of the disc 10 by means of the adjusting screw 7 so that the release occurs after each tappet has passed the highest point in its path by from 3° to 5°. The angle of revolution of the disc 10 is thus from 93° to 95° during the time that the hammer is being lifted and from 87° to 85° during the drop of the hammer.

In a typical machine the drop of the hammer can be varied from .25 to 2.5 inches and, corresponding to this variation, the appropriate speed of the lifting disc can be varied from 85 to 295 revolutions per minute. In the machine illustrated the specimen under test was rotated so that it was struck at a different point each time the hammer was dropped and under the above noted conditions of operation the hammer struck from 170 to 180 blows per minute. As the weight of the hammer is varied by the placing or removal of pieces upon its head as above indicated, the bolt 18 is correspondingly adjusted to maintain the center of percussion directly above the test specimen x.

I claim:

1. The combination in an impact testing machine of means for supporting a test specimen; a hammer; a rotary member; a tappet on said member positioned to raise and thereafter release the hammer to permit it to fall upon a test specimen; means for adjusting the tappet to vary the drop of the hammer; with means for adjusting the position of the rotary member to regulate the point of release of the hammer.

2. The combination in an impact testing machine of means for supporting a test specimen; a hammer; a rotary member; a tappet on said member positioned to raise and thereafter release the hammer to permit it to fall upon a test specimen; with means for adjusting the rotary member in a plane parallel to the plane of operation of the hammer to regulate the point of release of the latter.

3. The combination in an impact testing machine of means for supporting a test specimen; a hammer; a bearing structure slidably carried on the supporting structure; a shaft mounted in said bearing structure; a disc carried by said shaft; at least one hammer-engaging tappet carried by the disc; with means for adjusting said bearing structure to vary the point of release of the hammer.

4. The combination in an impact testing machine of means for supporting a test specimen; a pivotally mounted hammer having a head with a laterally projecting shoulder; a rotary member; and a tappet on said member positioned to engage the shoulder of the hammer head to first raise the same and thereafter release it to permit it to drop on a test specimen.

5. The combination in an impact testing machine of means for supporting a test specimen; a pivotally mounted hammer having a head with a laterally projecting shoulder; a rotary member; and a tappet on said member having a cylindrically curved surface positioned to engage the shoulder of the hammer head and raise the same as the rotary member is turned, said parts being positioned to cause the tappet to disengage the shoulder and release the hammer at approximately the highest point of its path of rotation.

6. The combination in an impact testing machine of a supporting structure; means for supporting a test specimen thereon; an elongated bar pivotally supported on the structure; a shouldered head on one end of said bar positioned to engage the test specimen; an adjustable weight mounted on the other end of the bar; a rotary member mounted adjacent the head; and at least one laterally projecting tappet carried by said rotary member and positioned to engage the shoulder of the head to first raise and then release the same.

7. The combination in an impact testing machine of a supporting structure; a bar pivotally mounted thereon; a head mounted on one end of the bar and including a specimen-engaging portion having a stem extending transversely of the bar; means for clamping a weight to the stem; with means for periodically raising the hammer and thereafter releasing the same to permit it to drop upon a test specimen.

8. The combination in an impact testing machine of means for supporting a test specimen; a hammer; a rotary member; at least one tappet mounted on said member, positioned to raise and thereafter release the hammer as the member is turned; a recording element mounted on the hammer; and means for supporting a record sheet in position to cooperate with said element.

In witness whereof I affix my signature.

DUNLAP J. McADAM, Jr.